Jan. 1, 1924
W. R. STRUNK
AXLE ADJUSTING DEVICE
Filed March 24, 1923
1,479,562
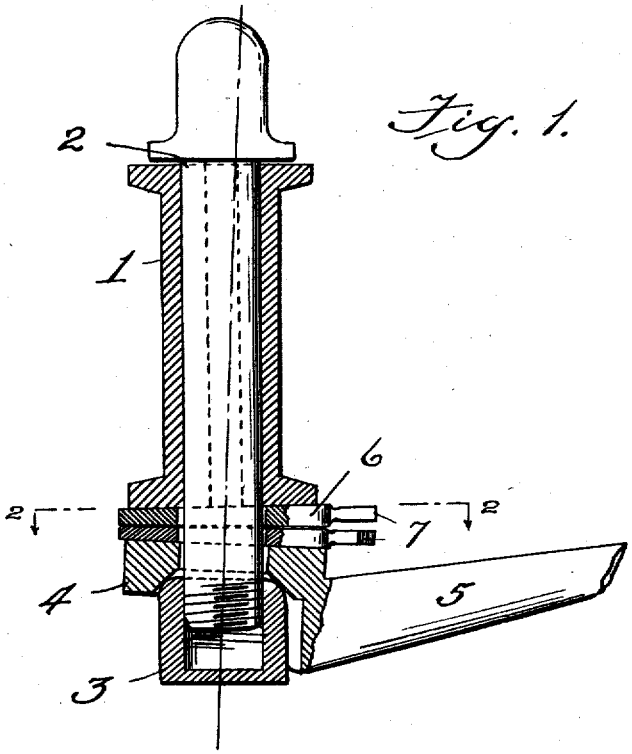
Fig. 1.
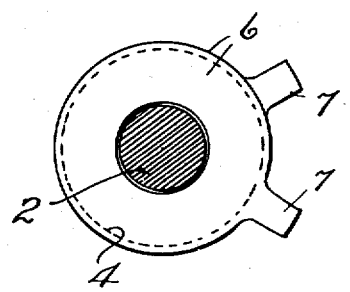
Fig. 2.
Walter R. Strunk
Inventor
By
Attorney Patented Jan. 1, 1924.

1,479,562

UNITED STATES PATENT OFFICE.

WALTER R. STRUNK, OF READING, PENNSYLVANIA.

AXLE-ADJUSTING DEVICE.

Application filed March 24, 1923. Serial No. 627,386.

*To all whom it may concern:*

Be it known that I, WALTER R. STRUNK, a citizen of the United States, residing at Reading, in the county of Berks and State of Pennsylvania, have invented certain new and useful Improvements in Axle-Adjusting Devices, of which the following is a specification.

This invention relates to improvements in axle adjustment and it pertains more particularly to a means for "pitching" or setting the front axle of a vehicle at the desired angle for easy or non-quivering driving.

The invention is intended more particularly for use on Ford or like cars, in which it is necessary to pitch the front axle slightly forward at the upper side, when the most satisfactory steering is to be secured.

Ordinarily, the radius rod is bent, to secure the desired pitch in the axle, but this is unsatisfactory in many ways, and to overcome this, I have devised a simple invention in the form of a pair of like washers or discs, slightly tapered, and each provided with a lip projecting from the periphery, so that, when the pair of discs is placed beneath the axle, between it and the end of the radius rod, the proper pitch or adjustment of the axle may easily be secured by simply turning the discs.

The invention is more fully described in the following specification and clearly illustrated in the accompanying drawing, in which:

Figure 1 is a sectional view through an axle and the forward end of the radius rod, with my invention applied thereto.

Figure 2 is a sectional view through 2—2 of Figure 1.

The numeral 1 designates a vehicle axle of simple form, and 2 the spring perch, whose bolt or stem passes downwardly through the axle and is provided with a suitable nut 3.

This nut usually secures the forward end 4 of the radius rod 5 to the under side of the axle, but in my present case I interpose between the end of the radius rod and the under side of the axle, a pair of like discs or washers, surrounding the bolt.

These discs 6 are each formed with a thumb engaging lip 7 at one point on its periphery, and the flat surfaces of the discs are tapered with relation to each other, so that, when the discs are in position, and it is desired to throw the upper side of the axle forward, the discs are turned by pressing the lips either toward or away from each other, and this movement will raise or lower the inner lower edge of the axle with relation to the flat upper surface of the inner end of the radius rod, and thus give the axle the desired pitch necessary for easy steering.

It is evident that in some cases, a single disc may be used with fairly good results, or that one flat and one tapered disc may be used, but in any case, the object is to increase the distance between the inner lower edge of the axle and the upper edge of the radius rod, when it is desired to throw the upper end of the axle forward.

The device is easily applied, costs very little to manufacture, and accomplishes a very desirable object inasmuch as one of the very disagreeable features of steering the light cars is due to the so-called "shimmying" or unsteady action of the front axle, due to bent radius rods or other causes.

With my improved device, any such irregularity may be easily overcome and the attempt to restore the parts to normal position by bending the radius rod is no longer necessary, as the discs will take up the irregularity whether it is slight or decided.

The discs may be made of any suitable material.

Having thuse fully described my invention, what I claim and desire to secure by Letters Patent is:—

1. In a device for adjusting vehicle axles, the combination of an axle, a radius rod, a bolt passing through the axle and the end of the radius rod, a nut adapted to draw the axle and the radius rod together, and a tapered, rotatable member interposed between the axle and the radius rod, whereby the angle of the axle with relation to the radius rod may be changed.

2. In a device of the character described, an axle, a radius rod, a bolt and nut for securing the radius rod to the axle, and a pair of tapered discs interposed between the axle and the end of the radius rod, and surrounding the bolt, whereby the turning of the discs will change the angle of the axle with relation to the radius rod.

In testimony whereof I affix my signature.

WALTER R. STRUNK.